(12) United States Patent
Hiemenz (10) Patent No.: US 8,518,149 B2
(45) Date of Patent: Aug. 27, 2013

(54) CHLORINE GAS PRODUCTION

(75) Inventor: James J. Hiemenz, Baton Rouge, LA (US)

(73) Assignee: Dow Global Technologies LLC, Midland, MI (US)

( * ) Notice: Subject to any disclaimer, the term of this patent is extended or adjusted under 35 U.S.C. 154(b) by 358 days.

(21) Appl. No.: 12/962,230

(22) Filed: Dec. 7, 2010

(65) Prior Publication Data
US 2011/0146309 A1   Jun. 23, 2011

Related U.S. Application Data

(60) Provisional application No. 61/287,516, filed on Dec. 17, 2009.

(51) Int. Cl.
*B01D 53/00* (2006.01)

(52) U.S. Cl.
USPC .................... 95/39; 95/288; 62/606

(58) Field of Classification Search
None
See application file for complete search history.

(56) References Cited

U.S. PATENT DOCUMENTS

| | | | |
|---|---|---|---|
| 2,754,666 A | 7/1956 | Spitzer | |
| 3,230,724 A | 1/1966 | Havas | |
| 3,410,099 A | 11/1968 | Hooker et al. | |
| 3,501,922 A | 3/1970 | Schmidt et al. | |
| 3,954,430 A * | 5/1976 | Curtis et al. | 62/619 |
| 4,128,409 A * | 12/1978 | Bennett | 62/617 |
| 4,295,945 A | 10/1981 | Bergner et al. | |
| 4,321,795 A | 3/1982 | Brandt et al. | |
| 4,381,190 A | 4/1983 | Carron et al. | |
| 4,774,070 A | 9/1988 | Itoh et al. | |
| 5,000,006 A | 3/1991 | Itoh et al. | |
| 5,490,390 A | 2/1996 | Boyette et al. | |
| 5,499,506 A * | 3/1996 | Nagamura et al. | 62/620 |
| 5,861,049 A | 1/1999 | Lokhandwala | |
| 5,985,226 A | 11/1999 | Zeller et al. | |
| 6,134,912 A | 10/2000 | Sauer | |
| 6,387,345 B1 | 5/2002 | Gestermann et al. | |
| 6,915,660 B2 | 7/2005 | Hartigan et al. | |
| 7,024,885 B2 | 4/2006 | Villalobos | |
| 2009/0304572 A1 | 12/2009 | Sesing et al. | |

FOREIGN PATENT DOCUMENTS

EP 0811815 B1 * 8/2002
WO 2004018355 4/2004

OTHER PUBLICATIONS

International Search Report and Written Opinion from related PCT application PCT/US2010/003101, dated May 6, 2011, 13 pages.

* cited by examiner

*Primary Examiner* — Duane Smith
*Assistant Examiner* — Phillip Shao
(74) *Attorney, Agent, or Firm* — Brooks, Cameron & Huebsch, PLLC (57) ABSTRACT

Embodiments of the present disclosure include a process for the production of chlorine gas. For the various embodiments, the process includes compressing a gas mixture of vaporized liquid chlorine and a feed gas containing chlorine to form a compressed gas. Chlorine in the compressed gas is condensed into liquid chlorine. A first portion of the liquid chlorine is vaporized to provide a heat of condensation to condense chlorine from the compressed gas into liquid chlorine. A second portion of the liquid chlorine is vaporized to provide both the vaporized liquid chlorine for the gas mixture and a heat of condensation to cool a tail gas from the process. A chlorine gas product from the vaporized first portion of the liquid chlorine is also produced.

14 Claims, 3 Drawing Sheets

CHLORINE GAS PRODUCTION

PRIORITY INFORMATION

This application claims priority to U.S. Provisional Application 61/287,516 filed Dec. 17, 2009, the specification of which is incorporated herein by reference.

FIELD OF DISCLOSURE

The present disclosure relates to a process for the production of a gas, and in particular to the production of chlorine gas.

BACKGROUND

Chlorine is used in many everyday products. For example, it is used in producing safe drinking water, in the production of paper products, in textile production, in petroleum products and chemicals, medicines, antiseptics, insecticides, foodstuffs, solvents and cleaners, paints, plastics, refrigerant fluids, chloromethane, ethylene glycol, chloroform, carbon tetrachloride and many other products.

In its elemental form, chlorine is a greenish yellow gas, which combines directly with many elements. Chlorine can be produced in a number of ways. One of the largest is through the electrolysis of a sodium chloride (common table salt) solution, often called "brine." As brine, the sodium chloride has dissociated into sodium cations and chlorine anions. During the electrolysis process, the chloride ions are oxidized at the anode to form chlorine gas and water molecules are reduced at the cathode to form hydroxyl anions and hydrogen gas. The sodium ions in the solution and the hydroxyl ions produced at the cathode constitute the components of sodium hydroxide formed during the electrolysis of sodium chloride.

The chlorine and hydrogen produced in the electrolysis process undergo further processing in the form of chlorine liquefaction, hydrochloric acid production or hypochlorite production. A chlorine liquefaction system consists of four sections namely, chlorine drying, chlorine compression, chlorine liquefaction, and liquid chlorine storage. Chlorine drying can be carried out in a multi-stage operation in which sulphuric acid is used to "dry" (i.e., remove water) the chlorine gas. From the drying system, the chlorine gas is piped to a chlorine gas compressor. In the chlorine gas compressor, the pressure of the chlorine gas is increased to a level suitable for a chlorine liquefaction unit. The chlorine liquefaction unit includes one or more heat exchangers in which the chlorine gas is cooled and condenses to a liquid. Cooling is typically performed by a closed-loop compressor based refrigeration system.

Normally the chlorine and the heat transfer fluid used to liquefy the chlorine are substantially isolated from each other. A problem of particular concern in chlorine liquefaction plants, however, is one of safety in the event the chlorine and the heat transfer fluid used to liquefy the chlorine come into mutual contact. When such mutual contact does occur, it is usually, but not necessarily, due to failure of the condenser through which both materials flow. The failure can range from inconsequential, as for example where a very small leak and little or no reaction have occurred, to catastrophic, as for example where there is a major rupture of one or more tubes within the condenser. Between these extremes important adverse consequences can occur, as for example unacceptable contamination of the chlorine by heat transfer fluid or vice versa, with or without contamination by reaction products.

SUMMARY

Embodiments of the present disclosure include a process for the production of chlorine gas. For the various embodiments, the process includes compressing a gas mixture of vaporized liquid chlorine and a feed gas containing chlorine to form a compressed gas. Chlorine in the compressed gas is condensed into liquid chlorine. A first portion of the liquid chlorine is vaporized to provide a heat of condensation to condense chlorine from the compressed gas into liquid chlorine. A second portion of the liquid chlorine is vaporized to provide both the vaporized liquid chlorine for the gas mixture and a heat of condensation to cool a tail gas from the process. A chlorine gas product from the vaporized first portion of the liquid chlorine is also produced.

Embodiments of the present disclosure also provide that in condensing chlorine from the compressed gas a gas stream having non-condensed chlorine gas and other non-condensed gases is separated from the liquid chlorine, where a heat of vaporization from vaporizing the second portion of the liquid chlorine condenses at least a portion of the non-condensed chlorine gas into liquid chlorine.

DEFINITIONS

As used herein "chlorine gas" is defined as dichlorine ($Cl_2$) at standard temperature and pressure of 0° C. and an absolute pressure of 100 kPa (IUPAC).

As used herein "steel" is defined as an alloy of iron and carbon which can contain chromium, nickel, tungsten, molybdenum, manganese, vanadium, cobalt, zirconium and/or chromium.

As used herein an "indirect heat exchanger" is defined as a device in which heat is transferred between one medium and another, where the media are separated by a solid wall so that they do not mix. Such indirect heat exchangers can include, but are not limited to, shell and tube heat exchangers and plate heat exchangers (e.g., plate and frame) among others.

As used herein, "° C." is defined as degrees Celsius.

As used herein, "psia" is defined as pound-force per square inch absolute and implies the true (absolute) pressure.

As used herein, "ambient temperature" is defined as the temperature of the environment in which the process of the present disclosure is operated. Heat exchange fluid at ambient temperature according to the present disclosure is used without necessarily extracting heat therefrom.

As used herein, "a," "an" "the," "at least one," and "one or more" are used interchangeably. The terms "comprises" and variations thereof do not have a limiting meaning where these terms appear in the description and claims. Thus, for example, a compressor having a compression stage can be interpreted to mean that the compressor includes "one or more" compression stages.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

DETAILED DESCRIPTION

Embodiments of the present disclosure provide for producing a chlorine gas product. Producing the chlorine gas product according to the present disclosure can be accomplished with a reduction in the overall energy consumption as compared to processes that do not employ the same techniques and processes of the present disclosure. At least one reason for the reduction in the overall energy consumption achieved by the present disclosure is the simplification of the process for producing the chlorine gas product. This simplification of the chlorine gas process may also provides for a reduction in the power requirements, capital investment, operating and maintenance expenses associated with producing the chlorine gas product.

In simplifying the process, embodiments of the present disclosure allow for fewer mechanical components to be used in producing the chlorine gas product. Examples of such mechanical components include those used to move chlorine gas such as pumps and other components that have parts that either rotate and/or move relative to each other. These mechanical components often times utilize iron based materials (e.g., steels such as stainless steel) in these rotating parts. As the chlorine gas contacts the iron in these mechanical components the chlorine oxides the iron to form iron (III) chloride (also known as ferric chloride). As the rotating part moves, this layer of oxide can be removed exposing more iron that is available to oxidize. As this oxidation reaction is exothermic, there can be build-up of heat in the various mechanical components. This heat needs to be dissipated in order to maintain safety in the system. By reducing the need for such mechanical components there is a corresponding reduction in the opportunity for problems to arise in the process for producing chlorine gas according to the present disclosure.

In addition, the embodiments of the present eliminate the need for special refrigerants and the associated compressors by utilizing liquid chlorine produced in the process as a heat exchange fluid. In this capacity, the liquid chlorine is used for its heat of vaporization when changing state from a liquid to a vapor and is used for its heat of condensation when changing state from a vapor to a liquid. Using the chlorine as the heat exchange fluid in the embodiments of the present disclosure helps to eliminate issues that might arise if non-chlorine refrigerants were used in the process.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide any number of additional embodiments of the present disclosure. In addition, as will be appreciated the proportion and the relative scale of the elements provided in the figures are intended to illustrate the embodiments of the present invention, and should not be taken in a limiting sense.

Figure 1:
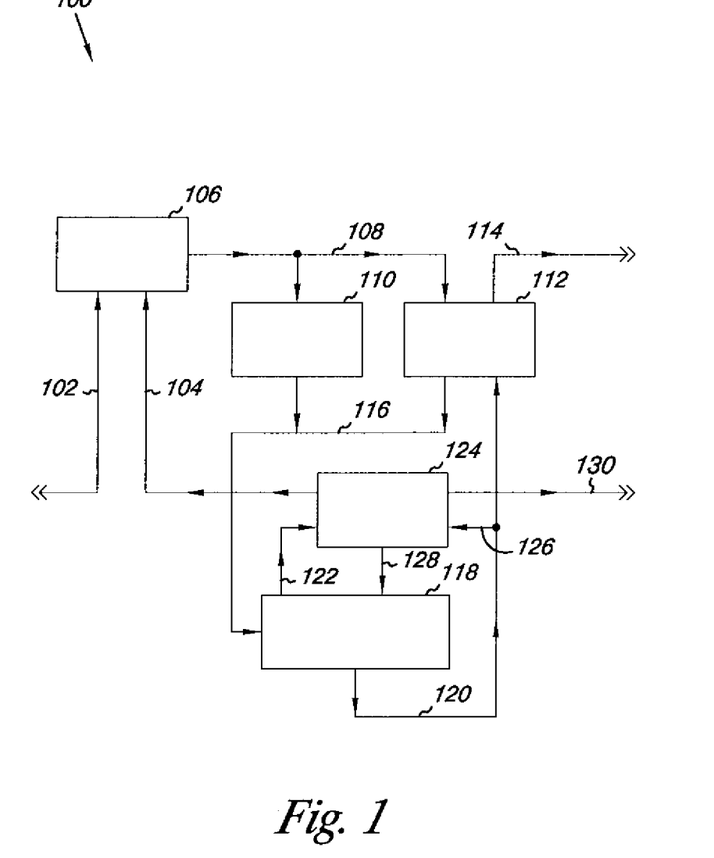
FIG. 1 provides a schematic of a process for producing a chlorine gas product according to an embodiment of the present disclosure.

Referring to FIG. 1, there is illustrated a schematic of a process 100 for the production of a chlorine gas product according to the present disclosure For the process 100, a gas mixture of a feed gas containing chlorine and vaporized liquid chlorine passes via conduits 102 and 104, respectively, to compressor 106. For the various embodiments, the compressor 106 can be positive displacement compressor such as a rotary compressor, a screw compressor, and/or a reciprocating compressor. Compressor 106 may include one compression stage or may include two or more compression stages to compress the gas mixture to produce a compressed gas at the desired pressure. Compressor 106 is sized and configured to provide and maintain the desired pressure in view of the pressure drops that occurs in the process 100 (e.g., during cooling, condensing, recycling of gases and liquid through the process 100). By varying the compression conditions, the maximum temperatures realized in the compressed gas can be controlled. For the various embodiments, interstage cooling can be used between compression stages of a multistage compressor.

For the various embodiments, the feed gas can include both chlorine gas and other gases. Other gases include, but are not limited to, hydrogen, oxygen, carbon dioxide, nitrogen, and traces of other gases. For the various embodiments, the feed gas has no less than 50 volume percent chlorine. Preferably, the feed gas has 90 to 99 volume percent chlorine.

For the various embodiments, the feed gas can be obtained from a variety of chlorine producing process. Examples of such processes include, but are not limited, to a diaphragm cell process, a membrane cell process and an electrolysis process of a brine of sodium chloride. Along with chlorine, the gas mixture of products from the chlorine production process can also include water vapor. The water vapor can be separated from the feed gas in a drying process. The drying process can be accomplished by passing the products from the chlorine producing process through one or more drying towers that contain a drying agent such as concentrated sulfuric acid. The drying process can reduce the amount of water present in the feed gas to less than 10 parts per million. Other drying methods are also possible.

The feed gas having been dried can be delivered to the compressor 106 at a temperature of 15 to 50° C. and at a pressure of 35 to 100 psia (241 to 689 mPa). The pressure of the gas mixture emerging from the compressor 106 can be dependent upon the volume percent chlorine gas in the gas mixture. In other words, the impurity level in the gas mixture will affect the pressure required to achieve condensation of the chlorine from the compressed gas using a heat exchange fluid at a give temperature, such as at ambient temperature. For example, the compressor 106 can be used to produce a pressure of 80 to 300 psia (552 to 2068 mPa) when the gas mixture has at least a 90 volume percent (%) of chlorine gas. When the gas mixture has approximately a 50 volume % of chlorine gas, however, the compressor 106 can be used to produce a pressure of 150 to 650 psia (1034 to 4482 mPa). So, it is possible that the compressor 106 can be used to produce a pressure of 80 to 650 psia for the gas mixture.

The compressed gas from compressor 106 passes via conduits 108 to a parallel series of condensers from which liquid chlorine and a gas stream having non-condensed chlorine gas and other non-condensed gases are recovered. As illustrated, the parallel series of condensers includes condenser 110 and a heat recovery unit 112. Condenser 110 and heat recovery unit 112 are used to condense chlorine in the compressed gas into liquid chlorine.

In condenser 110 at least a portion of the heat of compression can be removed from the compressed gas through an indirect heat exchanger utilizing a heat transfer fluid such as air and/or water. For the various embodiments, the heat transfer fluid can be supplied to the condenser 110 at a temperature below the dewpoint of the chlorine gas in the compressed gas. For the various embodiments, the heat transfer fluid is supplied at an ambient temperature. So, for the embodiments of the present disclosure it is possible to use air and/or water from the prevailing environment surrounding a location where the process 100 is taking place, where heat has not been extracted from the heat transfer fluid in order to change its temperature.

For the various embodiments, an ambient temperature for the heat transfer fluid used in the condenser 110 can be effective to extract enough heat from the compressed gas to condense a large portion of the chlorine into liquid chlorine. Preferably, this ambient temperature can be 0° C. to 50° C. So, the condenser 110 can employ air at 0° C. to 50° C. to at least partially condense chlorine from the compressed gas into liquid chlorine. As appreciated, the condensing temperature for the chlorine in the compressed gas can change as the pressure of the compressed gas changes and/or as the impurity level in the compressed gas changes. As such, the ambient temperature and/or type of the cooling fluid available can be used as at least one factor in determining the compression pressure of the compressed gas entering the condenser 110.

For the various embodiments, sufficient heat transfer fluid can be passed through the condenser 110 to cool the compressed gas to within a several degrees of the ambient temperature. This cooling is of an amount sufficient to liquefy a large portion of the chlorine gas in compressed gas. So, for example, condenser 110 employing air at 0° C. to 50° C. can cool the liquid chlorine condensing from the compressed gas to a temperature of 30° C. to 55° C.

In heat recovery unit 112 at least a portion of the heat of compression can be removed from the compressed gas through an indirect heat exchanger. To accomplish this, a first portion of liquid chlorine is supplied to and is vaporized in indirect heat exchanger of the heat recovery unit 112. Vaporizing the first portion of liquid chlorine provides a heat of condensation sufficient to bring the temperature of the compressed gas in the heat recovery unit 112 below the dewpoint of the chlorine gas, thereby condensing a large portion of the chlorine gas into liquid chlorine. For the various embodiments, the first portion of the liquid chlorine can be vaporized to a pressure up to 187 psia so as to produce a temperature for the vaporized liquid chlorine of 0° C. to 45° C. in the heat recovery unit 112. Preferably, the vaporized liquid chlorine can have a temperature of 25° C. to 45° C. in the heat recovery unit 112.

For the various embodiments, the first portion of liquid chlorine vaporized in the heat recovery unit 112 also produces chlorine gas product of the present disclosure. The chlorine gas product from the vaporized first portion of the liquid chlorine passes from the heat recovery unit 112 via conduit 114.

For the various embodiments, the large portion of chlorine liquefied in the parallel series of condensers (e.g., condenser 110 and the heat recovery unit 112) can include at least 82 percent, preferably 96 to 98 percent of the chlorine gas present in the compressed gas. After liquefaction, the gas steam can include from 1 to 25 percent by volume of the other non-condensed gases with the remaining gas being non-condensed chlorine.

The liquid chlorine and the gas stream from the condenser 110 and the heat recovery unit 112 pass via conduit 116 to a liquid chlorine receiver 118. Liquid chlorine and the gas stream enter and separate in the liquid chlorine receiver 118 at a relatively high pressure, corresponding roughly to the pressure in the parallel series of condensers (condenser 110 and heat recovery unit 112). From the liquid chlorine receiver 118, the liquid chlorine exits via conduit 120 and the gas stream exits via conduit 122.

For the various embodiments, the gas stream having non-condensed chlorine gas and other non-condensed gases passes to a gas cooler 124 via conduit 122. For the various embodiments, the gas cooler 124 uses an indirect heat exchanger to recover additional chlorine in liquid form from the gas steam under the prevailing pressure. According to the present disclosure, a second portion of the liquid chlorine taken from conduit 120 is supplied to the indirect heat exchanger in the gas cooler and is vaporized to provide a heat of condensation to cool a tail gas from the process. For the various embodiments, the vaporizing liquid chlorine flowing through the indirect heat exchanger of either the heat recovery unit 112 and/or the gas cooler 122 can be co-current or counter-current to the flow of the compressed gas and the gas stream, respectively. The second portion of the liquid chlorine vaporized can then be returned via conduit 104 to the compressor unit 106 (e.g., to a lower compression stage) as the vaporized liquid chlorine of the gas mixture.

For the various embodiments, the heat of vaporization from vaporizing the second portion of the liquid chlorine can also condense at least a portion of the non-condensed chlorine gas into liquid chlorine. For the various embodiments, vaporizing the second portion of the liquid chlorine can cool the gas stream in the gas cooler 124 to 0° C. to 10° C.

Liquid chlorine produced in the gas cooler 124 is returned to the liquid chlorine receiver 118 via conduit 128. The non-condensed gases having had the additional chlorine removed as a liquid and returned to the liquid chlorine receiver 118 passes from the gas cooler 124 and the process 100 as a tail gas via conduit 130. Preferably, the tail gas contains 25 to 35 mole percent of chlorine gas. The tail gas can then be used in additional processes, as are known.

As provided herein, liquid chlorine exits from the liquid chlorine receiver 118 via conduit 120, where it supplies both the first portion of liquid chlorine to the heat recovery unit 112 and the second portion of liquid chlorine to the gas cooler 124. As discussed, vaporizing the first portion of the liquid chlorine provides the heat of condensation to condense chlorine from the compressed gas in the heat recovery unit 112 into liquid chlorine and produces the chlorine gas product. Vaporizing the second portion of the liquid chlorine provides the vaporized liquid chlorine for the mixture present in the compressor 106 and the heat of condensation to cool the tail gas from the process 100.

Figure 2:
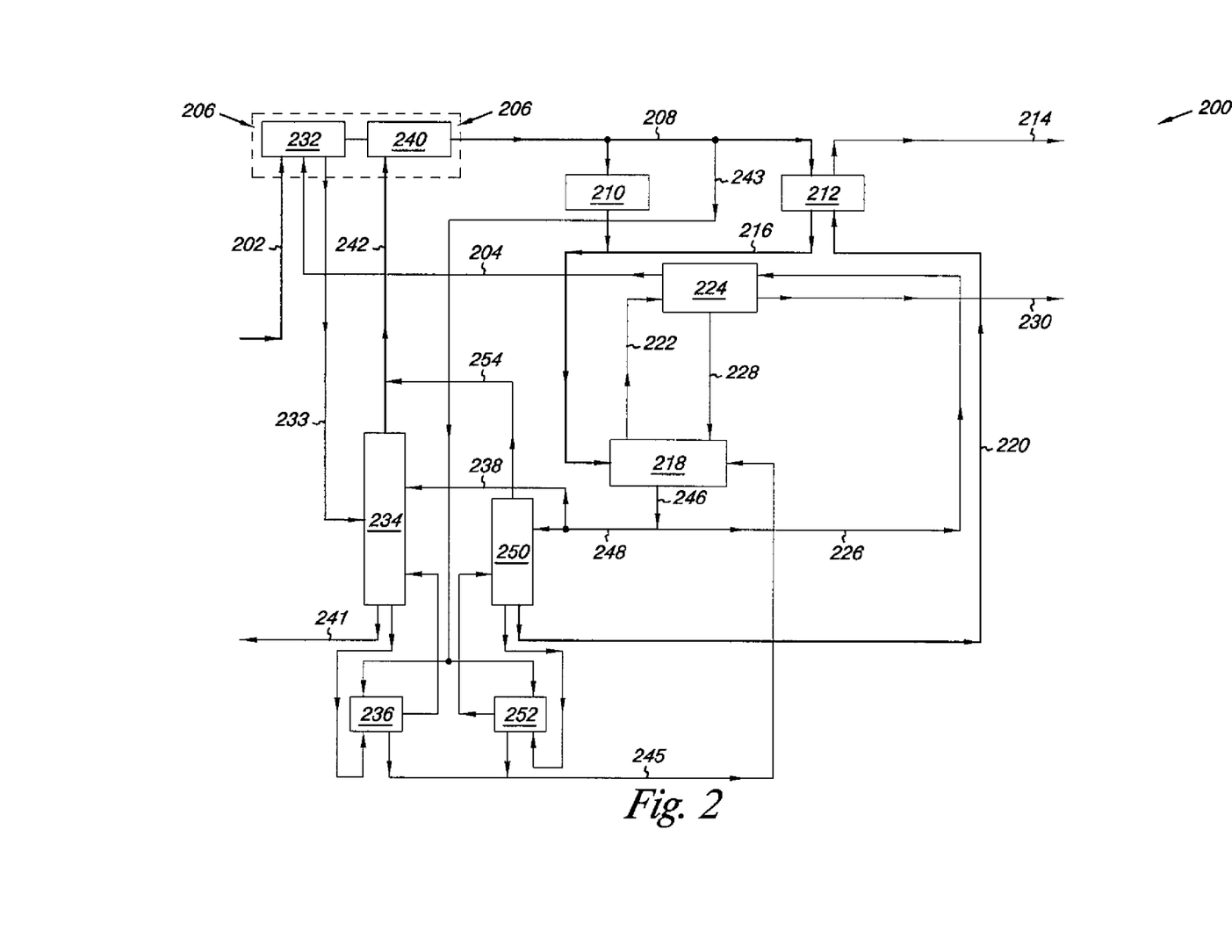
FIG. 2 provides a schematic of a process for producing a chlorine gas product according to an embodiment of the present disclosure.

Referring now to FIG. 2, there is shown an additional embodiment of a process 200 according to the present disclosure. As discussed, the feed gas, the vaporized liquid chlorine and the liquid chlorine can contain varying amounts and types of impurities (things other than dichloride). These impurities can include, but are not limited to, chlorine heavy compounds and light compounds, as will be discussed more fully herein. In an effort to provide an energy efficient process it is desirable to reduce the concentration of these impurities in the vaporized liquid chlorine and the liquid chlorine of the present process. Processes 200 and 300, to be discussed herein, help to accomplish this objective.

In process 200, the mixture of the feed gas containing chlorine and vaporized liquid chlorine, as described herein, passes via conduits 202 and 204, respectively, to a first compression stage 232 of compressor 206. The first compression stage 232 of compressor 206 can compresses the gas mixture to a first compression pressure of 120 to 145 psia (827 to 1000 mPa).

The gas mixture from the first compression stage 232 is supplied via conduit 233 at the first compression pressure to a chlorine heavies removal tower 234. For the various embodiments, the chlorine heavies removal tower 234 separates at least some of the chlorine heavy compounds from the mixture in the chlorine heavies removal tower 234. For the various embodiments, chlorine heavy compounds can be organic and/or inorganic chlorine compounds apart from dichloride that are present in the compressed gas. An example of such a chlorine heavy compound includes, but is not limited to, chlorides such as bromine chloride. Additional examples of such chlorine heavy compounds include those chlorine compounds having a molecular weight of at least 85 grams/mole.

For the various embodiments, the chlorine heavies removal tower 234 can be tray column or a packed column that includes a reboiler 236. For the various embodiments, the chlorine heavies removal tower 234 operates at a pressure of 120 to 150 psia and a temperature of 25° C. to 35° C.

The compressed gas from the first compression stage 232 is fed into the chlorine heavies removal tower 234 via conduit 233. The chlorine heavies removal tower 234 also receives an amount of liquid chlorine as a reflux from the liquid chlorine receiver 218 via conduit 238, as will be discussed herein. Reboiler 236 is used to boil up and maintain a vapor reflux of chlorine from the compressed gas and the liquid chlorine reflux in the chlorine heavies removal tower 234, while allowing for at least a portion of the chlorine heavy compounds to be removed as a residue via conduit 241.

For the various embodiments, feed locations for both the compressed gas from the first compression stage 232 and the reflux of liquid chlorine can be determined based upon the composition of the liquid and vapor phases along the chlorine heavies removal tower 234. In addition, the purity of the gas mixture removed as the distillate can be dependent upon the number and location of stages (i.e., number of trays or the height of packing) and the reflux ratio used in the chlorine heavies removal tower 234. As a result of the separations process in the chlorine heavies removal tower 234, the gas mixture removed as the distillate has a reduced concentration of chlorine heavy compounds.

This gas mixture is supplied to a second compression stage 240 of compressor 206 via conduit 242. In the second compression stage 240 the gas mixture is further compressed to a desired pressure, such as those provided in the discussion of FIG. 1, to provide the compressed gas. As discussed herein, the pressure of the gas mixture emerging from the compressor 206 can be dependent upon the volume percent chlorine gas in the gas mixture.

The compressed gas from compressor 206 passes via conduits 208 to the parallel series of condensers from which liquid chlorine and a gas stream having non-condensed chlorine gas and other non-condensed gases are recovered. As illustrated, the parallel series of condensers includes the condenser 210 and the heat recovery unit 212, as discussed herein. The parallel series of condensers also includes the reboiler 236 and a reboiler 252. For the various embodiments, the reboilers 236 and 252 extract at least a portion of the heat of compression from the compressed gas through their indirect heat exchangers, as will be discussed herein, to at least partially condense the chlorine gas from the compressed gas into liquid chlorine. The liquid chlorine and the gas stream from the reboilers 236 and 252 pass via conduit 244 to the liquid chlorine receiver 218.

Liquid chlorine from the liquid chlorine receiver 218 exits via conduit 246 and the gas stream exits via conduit 222. Gas cooler 224 uses the second portion of the liquid chloride passing via conduits 246 and 226 in an indirect heat exchanger to recover additional chlorine in liquid form from the gas steam. The second portion of the liquid chlorine vaporized can then be returned via conduit 204 to the compressor unit 206 (e.g., the first compression stage 232) as the vaporized liquid chlorine of the gas mixture.

Liquid chlorine produced in the gas cooler 224 is returned to the liquid chlorine receiver 218 via conduit 228. The non-condensed gas mixture having had the additional chlorine removed as a liquid and returned to the liquid chlorine receiver 218 passes from the gas cooler 224 and the process 200 as a tail gas via conduit 230. Preferably, the tail gas contains 25 to 35 mole percent of chlorine gas.

The liquid chlorine exits the liquid chlorine receiver 218 via conduit 246. A portion of the liquid chlorine is removed via conduit 248 to supply liquid chlorine as a reflux to the chlorine heavies removal tower 234 via conduit 238, as disused herein. Conduit 248 supplies the remaining amount of liquid chlorine with the light compounds to a light compounds stripping tower 250. For the various embodiments, the light compounds stripping tower 250 strips at least some of the light compounds present in the liquid chlorine coming from the liquid chlorine receiver 218. For the various embodiments, light compounds can be organic and/or inorganic non-condensed compounds present in the liquid chlorine. Examples of such light compounds include, but are not limited to, carbon dioxide, oxygen, nitrogen, and hydrogen, among others.

For the various embodiments, the liquid chlorine can enter an upper portion of the light compounds stripping tower 250. As the liquid chlorine falls through the light compounds stripping tower 250 the liquid chlorine is brought into contact with chlorine vapor boiled up by the reboiler 252 in the light compounds stripping tower 250. For the various embodiments, the light compounds stripping tower 250 operates at a pressure of 120 to 160 psia and a temperature of 25 to 36° C.

As a result, carbon dioxide, oxygen, nitrogen, and other non-condensable gases dissolved in the liquid chlorine are caused to evaporate so that they can be removed as an overhead product from the light compounds stripping tower 250. The light compounds stripped in the light compounds stripping tower 250 are then supplied via conduit 254 to the mixture having the reduced chlorine heavy compounds removed as the overhead product from the chlorine heavies removal tower 234 in conduit 242. This mixture passes via conduit 242 to the second compression stage 240 of compressor 206.

Condensate in the light compounds stripping tower 250 is collected as liquid chlorine having a higher purity (i.e., a greater concentration) than the liquid chlorine that entered the light compounds stripping tower 250 and is thereafter drawn off through conduit 220. The liquid chlorine in conduit 220 having the reduced concentration light compounds is then supplied as the first portion of the liquid chlorine to the heat recovery unit 212, as previously discussed, to both provide cooling and to produce the chlorine gas product.

For the various embodiments, the heat energy supplied to the reboilers 236 and 252 can be from the gas mixture coming from the second compression stage 240 via conduit 243. For the various embodiments, the gas mixture can be supplied to indirect heat exchangers in the reboilers 236 and 252. In the reboilers 234 and 252 the heat of the gas mixture is supplied to the bottoms liquid of the heavy removal tower 232 and the light compound stripping tower 250, respectively, to provide boil-up in the respective tower 232 and 250. The energy from the boil-up allows the heavy removal tower 232 to separate at least some of the chlorine heavy compounds from the mixture and the light compounds stripping tower 250 to separate at least some of the light compounds from the mixture, as discussed herein. The gas mixture having give-up its heat is then supplied to the liquid chlorine receiver 218 via conduit 245.

Figure 3:
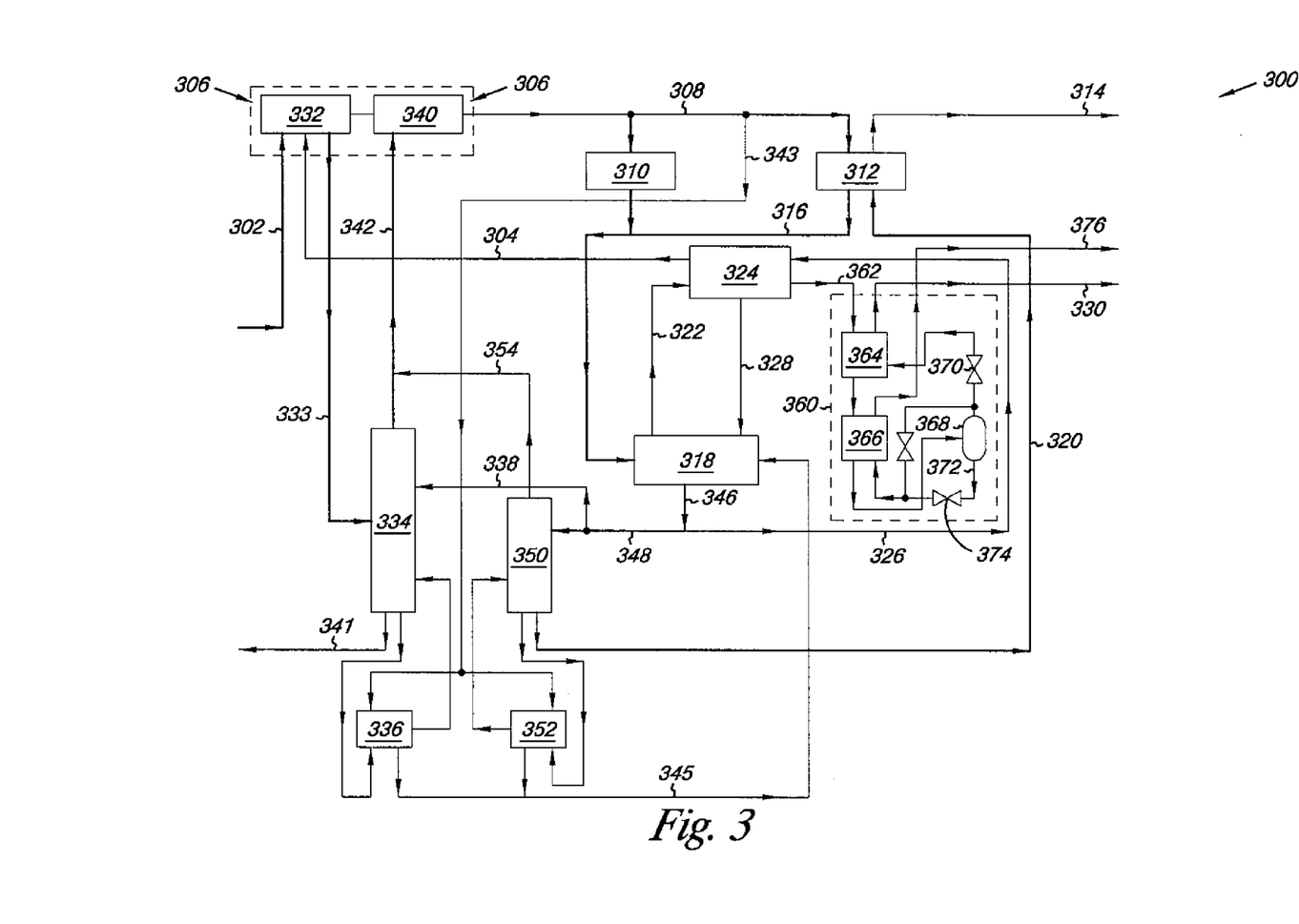
FIG. 3 provides a schematic of a process for producing a chlorine gas product according to an embodiment of the present disclosure.

Referring now to FIG. 3, there is shown an additional embodiment of a process 300 according to the present disclosure. Process 300 is as described above for processes 100 and 200, but further includes the use of a cold box cooler 360. For the various embodiments, the cold box cooler 360 can be used in conjunction with gas cooler 324 to further reduce the concentration of chlorine in the tail gas.

For the various embodiments, the cold box cooler 360 uses an indirect heat exchanger, such as a plate and frame heat exchanges or other heat exchanger as discussed herein, to further condense chlorine from the tail gas. As illustrated, the non-condensed gas mixture having had chlorine removed in the gas cooler 324 passes via conduit 362 into the cold box cooler 360. Inside the cold box cooler 360 the non-condensed gas mixture is first cooled with the tail gas in a first indirect heat exchanger 364. The tail gas having cooled the non-condensed gas mixture then exits the box cooler via conduit 330.

The cooled non-condensed gas mixture then enters a second indirect heat exchanger 366, where vaporizing liquid from the cold box cooler 360 further cools the non-condensed gas mixture. The non-condensed gas mixture still at high pressure, but having been cooled in the first and second heat exchangers 364, 366 of the cold box cooler 360 so as to partially condense the chlorine, then enters a receiving drum 368. From the receiving drum 368, the non-condensed gas mixture under high pressure is passed across a valve 370 to allow both the pressure and the temperature of the non-condensed gas mixture to drop. The non-condensed gas mixture then passes through the first heat exchanger 364 where it absorbs heat from the non-condensed gas mixture entering the cold box cooler 360 via conduit 362. The non-condensed gas mixture having absorbed the heat then exits the cold box cooler 360 via conduit 330 as the tail gas. For the various embodiments, the cold box cooler 360 can cool the tail gas to 0° C. to −25° C.

The high pressure liquid chlorine from receiving drum 368 can exit via conduit 372 where it vaporizes as it passes through valve 374. The vaporized liquid chlorine then absorbs heat from the non-condensed gas mixture at high pressure as the two fluids pass through the second heat exchanger 366. The vaporized liquid chlorine having absorbed heat from the non-condensed gas mixture in the second heat exchanger 366 exits the cold box cooler 360 via conduit 376 where it can be returned to the drying system, as discussed herein, to be used, for example, to cool the feed gas prior to entering the compressor.

As discussed herein, producing the chlorine gas product according to the present disclosure can be accomplished with a reduction in the overall energy consumption as compared to processes that do not employ the same techniques and processes of the present disclosure. One way of effectively demonstrating this reduction in overall energy consumption is by determining the total energy requirements to produce chlorine gas product, as provided herein, from a feed gas. One approach is to examine the total power in kilowatt hour per metric ton of chlorine produced required to produce the chlorine gas product.

In a conventional chlorine liquefaction process, energy is expended to compress a feed gas containing chlorine using a multistage compression system. This compression system forms a compressed gas having a pressure up to around 100 psia. Energy is also expended in refrigeration systems that are used to cool the compressed gas in order to liquefy chlorine. When impurities are left in feed gas, the energy cost of producing the liquefied chlorine also rises.

In order to more accurately compare the total energy costs per metric ton of chlorine produced in convention systems with that of the present disclosure, the energy required to vaporize the liquid chlorine of the conventional system to a chlorine gas having the same pressure and temperature of the chlorine gas product is also determined. This amount of energy is then added to energy to compress and liquefy the chlorine of the conventional system. These estimates then allow for a more direct comparison of the total energy costs of producing chlorine gas in the conventional systems and the present disclosure.

Based on the foregoing, it is predicted that the following comparative results will be possible for the embodiments of the present system. There is shown in Table 1 predicted results of the total power required to produce a chlorine gas.

| Process | Condensing Pressure (psia) | Final Condensing Temp. (° C.) | Volume Percent Chlorine Lost to Tail Gas | Compression Power (Kwhr/metric ton chlorine) | Refrigeration Power (Kwhr/metric ton chlorine) | Total Power (Kwhr/metric ton chlorine) | Vaporization Cost in Equivalents (Kwhr/metric ton chlorine) | Total Power & Vaporization Cost (Kwhr/metric ton chlorine) |
|---|---|---|---|---|---|---|---|---|
| Comparative Example A - Conventional Low Pressure Single Stage Compression | 60 | −3 | 15.00 | 25.9 | 32.9 | 58.8 | 30 | 88.8 |
| Comparative Example B - Conventional Low Pressure Two Stage Compression | 60 | −30 | 1.20 | 22.2 | 38.1 | 60.3 | 30 | 90.3 |
| Comparative Example C - Conventional Medium Pressure Two Stage | 100 | −30 | 1.00 | 29.7 | 26.4 | 56.1 | 30 | 86.1 |

-continued

| Process | Condensing Pressure (psia) | Final Condensing Temp. (° C.) | Volume Percent Chlorine Lost to Tail Gas | Compression Power (Kwhr/metric ton chlorine) | Refrigeration Power (Kwhr/metric ton chlorine) | Total Power (Kwhr/metric ton chlorine) | Vaporization Cost in Equivalents (Kwhr/metric ton chlorine) | Total Power & Vaporization Cost (Kwhr/metric ton chlorine) |
|---|---|---|---|---|---|---|---|---|
| Compression Prophetic Example 1 of the present disclosure (high purity gas) | 250 | −2 | 0.74 | 44.9 | 0 | 44.9 | 0 | 44.9 |
| Prophetic Example 2 of the present disclosure (low purity gas) | 250 | −25 | 0.71 | 47.4 | 0 | 47.4 | 0 | 47.4 |

As shown in Table 1, the predicted results of the total power required to produce one ton of chlorine illustrate the differences between the processes of the present disclosure and the conventional chlorine production processes. As shown, it is predicted that the power required to produce the chlorine gas product according to the present disclosure will be similar or less than the comparative examples from conventional processes, but will lose only a fraction of the chlorine in the tail gas (see third column of Table 1). In conventional processes, this higher percentage of chlorine in the tail gases ends up being used in other processes (e.g., an HCl burner). It is appreciated that for these conventional processes to achieve the same predicted chlorine percentages in the tail gas as provided in the present disclosure there would have to be a significant amount of additional energy used. As such, the embodiments of the present disclosure are believed to produce the chlorine gas product while achieving a reduction in the overall energy consumption as compared to processes that do not employ the same techniques and processes of the present disclosure.

What is claimed is:

1. A process, comprising:
   compressing in a first stage of a compressor a gas mixture of vaporized liquid chlorine, a feed gas containing chlorine and chlorine heavy compounds having a molecular weight of at least 85 grams/mole to produce a compressed gas at a first compression pressure;
   supplying the gas mixture at the first compression pressure to a chlorine heavies removal tower;
   removing at least some of the chlorine heavy compounds from the gas mixture in the chlorine heavies removal tower;
   compressing in a second stage of the compressor the gas mixture having a reduced concentration of chlorine heavy compounds to further compress the compressed gas;
   condensing in a condenser and a heat recovery unit chlorine in the compressed gas into liquid chlorine;
   vaporizing a first portion of the liquid chlorine to provide a heat of condensation to condense chlorine from the compressed gas into liquid chlorine; and
   vaporizing a second portion of the liquid chlorine to provide the vaporized liquid chlorine for the gas mixture and a heat of condensation to cool a tail gas from the process.

2. The process of claim 1, including producing a chlorine gas product from the vaporized first portion of the liquid chlorine.

3. The process of claim 1, where compressing the gas mixture in the second stage compresses the gas mixture to a pressure of 80 pounds-force per square inch absolute (psia) to 650 psia.

4. The process of claim 1, where condensing chlorine in the compressed gas includes using a condenser that employs air at 0° C. to 50° C. to at least partially condense chlorine from the compressed gas into liquid chlorine.

5. The process of claim 4, where condensing chlorine in the compressed gas includes cooling the liquid chlorine to 30° C. to 55° C.

6. The process of claim 1, where vaporizing the first portion of the liquid chlorine includes vaporizing the first portion of the liquid chlorine to a pressure up to 187 psia.

7. The process of claim 1, where condensing chlorine in the compressed gas includes separating a gas stream having non-condensed chlorine gas and other non-condensed gases from the liquid chlorine, where a heat of vaporization from vaporizing the second portion of the liquid chlorine condenses at least a portion of the non-condensed chlorine gas into liquid chlorine.

8. The process of claim 7, where vaporizing the second portion of the liquid chlorine cools the non-condensed chlorine gas and other non-condensed gases to 0° C. to 10° C.

9. The process of claim 7, including additionally cooling the gas stream to reduce the chlorine gas content in the tail gas to 25 to 35 mole percent chlorine.

10. The process of claim 1, where condensing chlorine in the compressed gas into liquid chlorine includes extracting heat from the compressed gas; and
    supplying the heat to a reboiler of the chlorine heavies removal tower for separating at least some of the chlorine heavy compounds from the gas mixture.

11. The process of claim 1, where the liquid chlorine includes light compounds, and the process further includes supplying the liquid chlorine with the light compounds to a light compounds stripping tower;
    stripping at least some of the light compounds from the liquid chlorine in the light compounds stripping tower;
    supplying the light compounds stripped in the light compounds stripping tower to the gas mixture having the reduced chlorine heavy compounds; and supplying the liquid chlorine having a reduced concentration light compounds as the second portion of the liquid chlorine.

12. The process of claim 11, where condensing chlorine in the compressed gas into liquid chlorine includes extracting heat from the compressed gas; and supplying the heat to a reboiler of to the light compounds stripping tower for stripping at least some of the light compounds from the liquid chlorine.

13. The process of claim 11, including removing a portion of the liquid chlorine from the reboiler of the light compounds stripping tower as a reflux; and supplying the reflux to the light compounds stripping tower.

14. The process of claim 1, where feed gas has no less than 50 volume percent (%) chlorine.

* * * * *